UNITED STATES PATENT OFFICE

ERNST HONOLD, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

BROWN VAT DYESTUFFS OF THE BENZANTHRONE ACRIDINE SERIES AND PROCESS OF MAKING SAME

No Drawing. Application filed November 26, 1928, Serial No. 322,093, and in Germany November 30, 1927.

I have found that by condensing halogenated benzanthrone compounds of the general formula:

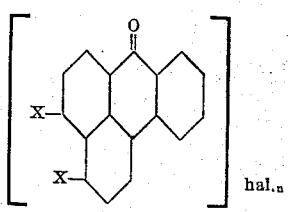

wherein $n$ means the number 1 or 2, and the benzanthrone residue may contain further substituents and wherein in one of the positions signified by X the same complex may be attached either by a direct carbon bond or by a sulfur bridge, with a compound of the 1-amino-anthraquinone-2-aldehyde type new valuable dyestuffs are obtained. According to the aforesaid general formula mono- and dihalogenated derivatives of benzanthrone, of its nuclear substitution products of 2.2'- and bz.1.bz.1'-dibenzanthronyl and of dibenzanthronylsulfide are suitable for my process.

Compounds of the 1-aminoanthraquinone-2-aldehyde type are 1-aminoanthraquinone-2-aldehyde itself or for instance the azomethines derived therefrom such as 1-aminoanthraquinone-2-aldehyde-anile or anthraquinone-1.2-isoxazole all of which correspond to the general formula:

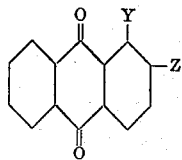

wherein Y means —NH$_2$, Z means —CHO, or —CH=N-phenyl, or Y and Z stand jointly for the group:

The condensation is carried out at elevated temperatures, preferably in presence of an organic diluent at the boiling temperature thereof and advantageously with addition of an acid-binding agent and of a catalyst.

The new condensation products are when dry dark powders, soluble in concentrated sulfuric acid to a brown to green solution, dyeing cotton from a brown to violet hydrosulfite vat brownish shades of a good fastness.

The chemical constitution of the new compounds cannot be stated with certainty, but it is supposed that at first hydrogen halide is split off and the anthrimides thus formed undergo in the further course of reaction a ring closure with elimination of water and yield an acridine or by a simultaneous oxidation an acridone ring. According to this hypothesis for instance the dyestuff, obtained by condensing bz.1-bromobenzanthrone with 1-aminoanthraquinone-2-aldehyde would correspond to the probable formula:

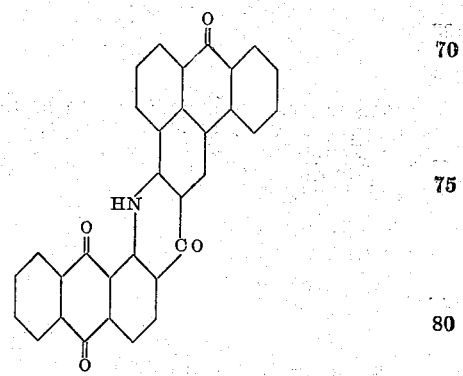

In order to further illustrate my invention the following examples are given, the parts being by weight and all temperatures in centigrade degrees, but it may be understood that my invention is not limited to the particular products or reacting conditions mentioned therein.

*Example 1.*—31 parts of bz.1-bromo-benzanthrone, 27 parts of 1-amino-anthraquinone-2-aldehyde, 25 parts of potash, 3 parts of cuprous chloride and 400 parts of nitrobenzene are boiled together while stirring. After about 8 hours the dyestuff formed is filtered and washed with benzene and alcohol, then with water containing some ammonia. It may be purified by dissolving it in sulfuric acid and precipitating it again by means of water. It dissolves in sulfuric acid to a reddish brown solution the color of which remains unchanged upon the addition of formaldehyde. It dyes cotton fast brown shades from a dark brown vat, which becomes violetish when standing. It probably corresponds to the formula:

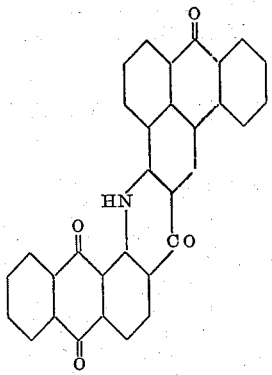

A similar dyestuff is obtained by starting from 2- or 6-chloro-benzanthrone.

When 1-amino-anthraquinone-2-aldehyde is replaced by the corresponding amount of 1-amino-anthraquinone-2-aldehyde-anile having the formula:

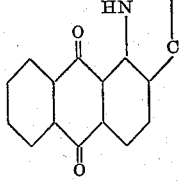

and the process is carried out as described in the foregoing example, a similar dyestuff is obtained. Preferably it is dissolved in sulfuric acid at 80–90° to a dark red solution and precipitated again therefrom. It yields with hydrosulfite and caustic alkali solution a violetish brown vat dyeing cotton fast dark brown shades.

By using anthraquinone-1.2-isoxazole instead of 1-amino-anthraquinone-2-aldehyde a fast brown vat dyestuff is obtained showing nearly the same properties as the dyestuff prepared by means of the aldehyde.

*Example 2.*—A mixture of 40 parts bz.1.6-dibromo-benzanthrone, 55 parts of 1-amino-anthraquinone-2-aldehyde, 50 parts of potash and 3 parts of copper acetate is boiled with 600 parts of nitrobenzene while stirring. After 10 hours' boiling the reaction mass (still warm) is filtered and washed with alcohol. The residue is extracted with hot water and a small amount of a caustic soda solution, washed and then dried. It is a dark brown powder soluble in sulfuric acid to a brown solution. It yields with hydrosulfite and a caustic soda solution a dark brown to brownish violet vat which dyes cotton yellowish brown shades of an excellent fastness. It probably corresponds to the formula:

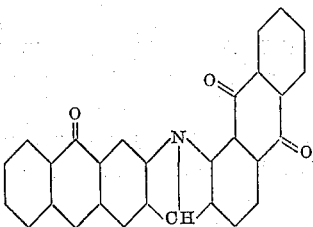

When bz.1-bromo-6-chloro-benzanthrone is used instead of bz.1.6-dibromo-benzanthrone, a similar dyestuff is obtained. When using half the quantity of 1-amino anthraquinone-2-aldehyde required for substituting both halogen atoms it is possible to isolate a condensation product containing only one acridine complex and one halogen atom.

By condensing bz.1.6-dibromo-benzanthrone with 1-amino-anthraquinone-2-aldehyde-anile having the formula:

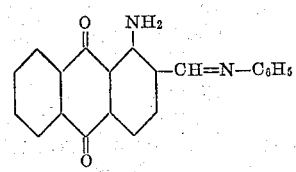

a dyestuff is produced the solubility of which in the alkaline hydrosulfite vat may be increased by dissolving it in sulfuric acid and precipitating it again by gradually adding water. It forms a dark-brownish violet vat which dyes cotton brownish violet shades.

Anthraquinone-1.2-isoxazole converted into a dyestuff probably is identical with that prepared from 1-amino-anthraquinone-2-aldehyde.

*Example 3.*—A mixture of 38.6 parts of bz.1-bromo-6-nitro-benzanthrone, melting at 296°, obtainable for instance by nitrating bz.1-bromo-benzanthrone dissolved in nitrobenzene, 27 parts of 1-amino-anthraquinone-2-aldehyde, 30 parts of potash, 3 parts of cuprous chloride and 300 parts of nitrobenzene is boiled for about 6 hours while stirring. When the reaction mass is filtered and washed, the new dyestuff remains as a brownish black powder, soluble in sulfuric acid to a brown solution and dyeing cotton from a dark red vat dark brown shades. It may be purified by vatting and precipitating it again whereby the nitro-group is converted into the amino-group.

When bz.1-bromo-6-nitro-benzanthrone is replaced by the equivalent amount of bz.1-bromo-6-benzene-sulfamino-benzanthrone and the process is otherwise carried out as described in this example, a condensation product is obtained which yields when saponified for instance by means of warm sulfuric acid a dyestuff substantially identical with the dyestuff prepared according to this example.

*Example 4.*—62 parts of dibromo-2.2'-dibenzanthronyl, prepared for instance by brominating 2.2'-dibenzanthronyl dissolved in chloro-sulfonic acid, and 55 parts of 1-amino-anthraquinone-2-aldehyde are boiled in 900 parts of nitrobenzene with the addition of 40 parts of potash and 5 parts of copper acetate while stirring under a reflux condenser. After about 12 hours the mass is cooled and filtered. The residue is washed with benzene, alcohol and water containing some ammonia. The dried dyestuff is a dark brown powder soluble in concentrated sulfuric acid to a dark reddish brown solution. With hydrosulfite and a caustic soda solution it forms a brown vat, dyeing cotton brown shades of an excellent fastness.

When instead of 1-amino-anthraquinone-2-aldehyde the corresponding amount of anthraquinone-1.2-isoxazole is used a very similar dyestuff is obtained dyeing cotton somewhat more olive brown shades.

*Example 5.*—72 parts of dibromo-bz.1.bz.1'-dibenzanthronyl, prepared for instance by introducing bz.1.bz.1'-dibenzanthronyl into an excess of bromine, 55 parts of 1-amino-anthraquinone-2-aldehyde, 50 parts of sodium acetate, 5 parts of cuprous chloride and 900 parts of nitrobenzene are boiled together for about 8 hours while stirring. After cooling the reaction mass, the dyestuff formed is filtered and washed. It dissolves in concentrated sulfuric acid to a dark reddish brown solution and forms a dark brown vat which dyes cotton brown to brownish olive shades of an excellent fastness.

When dibromo-bz.1.bz.1'-dibenzanthronyl and 1-amino-anthraquinone-2-aldehyde-anile having the formula:

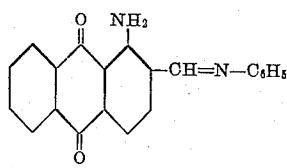

are condensed in like manner in the presence of potash and copper acetate, a dyestuff is obtained which may be dissolved at 80–90° in concentrated sulfuric acid to a reddish brown-violet solution and precipitated again from this solution. It forms a dark brownish black vat dyeing cotton very fast brownish gray shades.

*Example 6.*—32 parts of dibromo-dibenzanthronyl-sulfide, prepared for instance by acting on 6-bz.1-dibromo-benzanthrone dissolved in nitrobenzene with potassium xanthogenate, are condensed with 30 parts of 1-amino-anthraquinone-2-aldehyde in a like manner as described in example 4. The dyestuff thus obtained dissolves in concentrated sulfuric acid to a dark green solution and forms a dark brown vat which dyes cotton particularly fast yellowish brown shades.

I claim:

1. A process which comprises condensing at elevated temperatures halogenated benzanthrone compounds of the general formula:

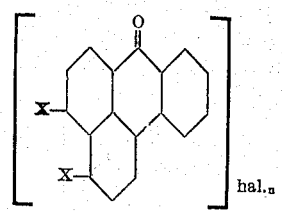

wherein $n$ means the number 1 or 2 and the benzanthrone residue may contain a further halogen atom, or a nitro or substituted amino group, and wherein in one of the positions signified by X the same benzanthrone residue may be attached with a compound corresponding to the formula:

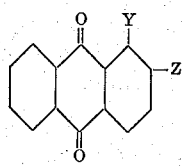

wherein Y means $-NH_2$, Z means $-CHO$, or $-CH=N$-phenyl, or Y and Z stand jointly for the group

2. A process which comprises condensing halogenated benzanthrone compounds of the general formula:

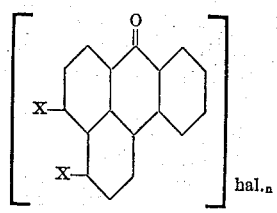

wherein $n$ means the number 1 or 2 and the benzanthrone residue may contain a further halogen atom, or a nitro or substituted amino group, and wherein in one of the positions signified by X the same benzanthrone residue may be attached with a compound corresponding to the formula:

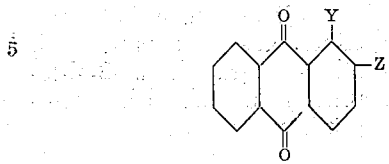

wherein Y means —NH₂, Z means —CHO, or —CH=N-phenyl, or Y and Z stand jointly for the group $$\diagup\!\!\!\!\!N\!\!-\!\!O\diagdown\!\!\!\!CH\diagup\!\!\!\!OH$$

in the presence of an organic diluent at the boiling temperatures thereof.

3. A process which comprises condensing halogenated benzanthrone compounds of the general formula:

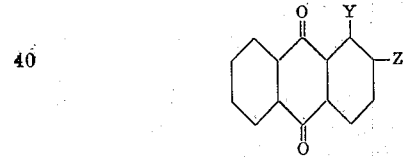

wherein $n$ means the number 1 or 2 and the benzanthrone residue may contain a further halogen atom, or a nitro or substituted amino group, and wherein in one of the positions signified by X the same benzanthrone residue may be attached with a compound corresponding to the formula:

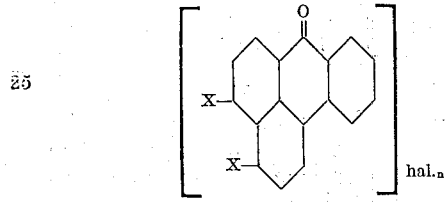

wherein Y means —NH₂, Z means —CHO, or —CH=N-phenyl, or Y and Z stand jointly for the group $$\diagup\!\!\!\!\!N\!\!-\!\!O\diagdown\!\!\!\!CH\diagup$$

in the presence of an organic diluent at the boiling temperatures thereof, with the addition of an acid-binding agent and of a catalyst.

4. As new compounds, vat dyestuffs probably corresponding to the general formula:

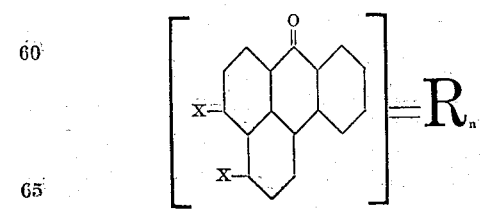

wherein $n$ means the number 1 or 2, R stands for the bivalent radicals

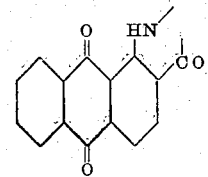

or

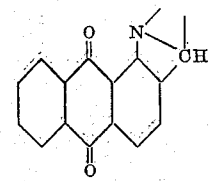

and the benzanthrone residue may contain a further halogen atom, or a nitro or substituted amino group and may be linked in 2- or bz.1-position signified by X with another benzanthrone residue of the same structure, which dyestuffs are dark-brown powders soluble in concentrated sulfuric acid to a brown to green solution and dyeing cotton brownish shades from a brown to violet vat.

5. A process which comprises condensing a benzanthrone compound being mono- or dihalogenated which may contain a further halogen atom or a nitro or substituted amino group, with a compound corresponding to the formula:

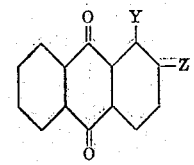

wherein Y means —NH₂, Z means —CHO, or —CH=N-phenyl, or Y and Z stand jointly for the group

in the presence of an organic diluent at the boiling temperatures thereof with addition of a catalyst and of an acid-binding agent.

6. As new compounds, vat dyestuffs probably corresponding to the general formula:

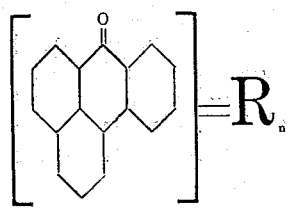

wherein $n$ means the number 1 or 2, R stands for the bivalent radicals

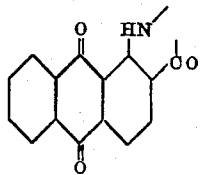

or

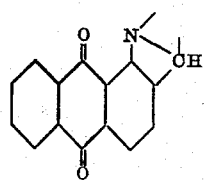

and the benzanthrone residue may contain a further halogen atom, or a nitro or substituted amino group, which dyestuffs are dark-brown powders soluble in concentrated sulfuric acid to a brown to green solution and dyeing cotton brownish shades from a brown to violet vat.

7. As a new compound the vat dyestuff of the probable formula:

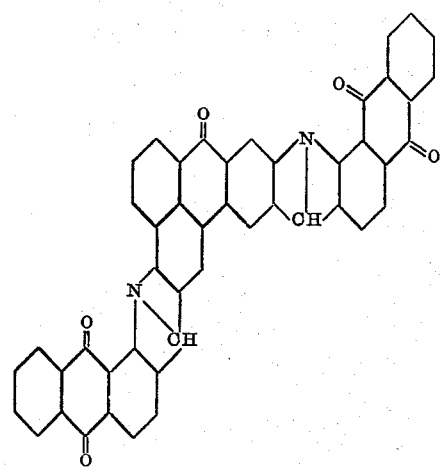

which compound represents a dark brown powder soluble in concentrated sulfuric acid to a brown solution, dyeing cotton from a dark brown to brownish violet vat yellowish brown shades of an excellent fastness.

In testimony whereof, I affix my signature.

ERNST HONOLD.